United States Patent [19]

Nagasaki et al.

[11] 4,112,337
[45] Sep. 5, 1978

[54] HIGH VOLTAGE GENERATOR

[75] Inventors: Tadashi Nagasaki; Mitsuharu Akatsu; Mitsuo Ohtsu, all of Yokohama, Japan

[73] Assignee: Hitachi, Ltd., Japan

[21] Appl. No.: 747,324

[22] Filed: Dec. 3, 1976

[30] Foreign Application Priority Data

Dec. 8, 1975 [JP] Japan ................................ 50-145059
Dec. 8, 1975 [JP] Japan ................................ 50-145060

[51] Int. Cl.² ........................................... H01J 29/70
[52] U.S. Cl. .................................... 315/411; 358/190
[58] Field of Search ............... 315/399, 411, 400, 405; 358/190

[56] References Cited

U.S. PATENT DOCUMENTS

| 3,500,116 | 3/1970 | Rietveld et al. | 315/405 |
| 3,519,741 | 7/1970 | Knight | 358/190 |
| 3,673,458 | 6/1972 | Moggre | 315/405 |
| 3,769,542 | 10/1973 | Pieters | 315/399 |
| 3,911,214 | 10/1975 | Mitsuda | 358/190 |
| 3,947,749 | 3/1976 | Kimura et al. | 358/190 |
| 4,041,355 | 8/1977 | Onodera | 315/399 |

Primary Examiner—S. C. Buczinski
Attorney, Agent, or Firm—Craig & Antonelli

[57] ABSTRACT

A high voltage generator suitable for use in a television receiver set wherein a frequency dependent attenuation circuit is connected to a primary winding of a flyback transformer which generates a high voltage to be supplied to a CRT whereby a regulation for a high voltage is improved.

14 Claims, 21 Drawing Figures

HIGH VOLTAGE GENERATOR

The present invention relates to a high voltage generator for use in a television receiver set or the like, and more particularly to a high voltage generator in which a regulation for a high voltage to be supplied to a CRT of the television receiver set is enhanced.

It is generally desirable that the high voltage for the television receiver set or the like, that is, a D.C. high voltage obtained by rectifying an output pulse voltage of a flyback transformer exhibits a small variation to the change in brightness of a picture image on the CRT or the change in a high voltage load current. Particularly in a color television receiver set, the regulation of the high voltage is highly desirable because the high voltage load current is large.

Heretofore, in the color television receiver set, as the brightness of the picture image on the CRT changes, the high voltage applied to the CRT also changes. When the variation of the high voltage is large, the change in the size of the picture image is also large resulting in a distortion in the picture image. It is well known that the closer to a square wave is a waveform of an output pulse of the flyback transformer, the more the variation of the high voltage is improved.

The present invention will now be described in more detail with reference to the accompanying drawings, in which.

Figure 1:
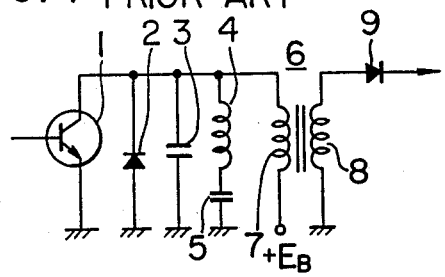
FIG. 1 shows a circuit configuration of a conventional high voltage generator.

Referring now to FIG. 1 which shows a circuit configuration of a conventional high voltage generator, numeral 1 denotes a horizontal output transistor, 2 a damper diode, 3 a resonance capacitor, 4 a deflection yoke 5 an S-shape distortion compensating and D.C. blocking capacitor, 6 a flyback transformer, 7 a primary winding of the flyback transformer, 8 a secondary winding, and 9 a high voltage rectifying diode.

Figure 2:
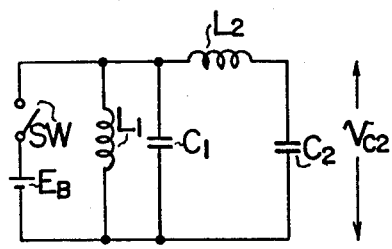
FIG. 2 shows an equivalent circuit thereof.

FIG. 2 shows an equivalent circuit of FIG. 1, in which SW corresponds to the horizontal output transistor 1 and the damper diode 2, $L_1$ is an equivalent inductance of the parallel circuit of the inductance of the deflection yoke 4 and the inductance of the primary winding 7 of the flyback transformer 6, $C_1$ corresponds to the resonance capacitor 3, $L_2$ is a leakage inductance between the primary winding 7 and the secondary winding 8, and $C_2$ is a grounding capacitance of the secondary winding 8. In the equivalent circuit of FIG. 2, a voltage $V_{C2}$ developed across the grounding capacitor $C_2$ when SW is open is given by the following formula (1);

$$V_{C2} = \frac{E_B T_s}{2} \cdot \frac{1}{\alpha} \cdot \frac{\alpha^2 \beta^2}{(\beta^2 - \alpha^2)} [\sin(\alpha t - \phi_1) - \frac{\alpha}{\beta} \sin(\beta t - \phi_2)] \quad (1)$$

where $T_s$: scan period $\phi_1 \approx \tan^{-1} \frac{2}{\alpha T_s}$ $\phi_2 \approx \tan^{-1} \frac{2}{\beta T_s}$ $\alpha^2 + \beta^2 = \frac{1}{L_1 C_1} + \frac{1}{L_2 C_2} + \frac{1}{L_2 C_1}$ $\alpha^2 \beta^2 = \frac{1}{L_1 C_1 L_2 C_2}$ and where $\alpha$ and $\beta$ are resonance angular frequencies of the resonance circuit with $\alpha$ representing a fundermental angular frequency and $\beta$ representing a harmonic angular frequency. It is well known by a harmonic tuning theory that when $\beta/\alpha$ satisfies the following formula (2) where N is an odd number, no ringing voltage appears during the scan period.

$$\frac{\beta}{\alpha} \doteq N \cdot \frac{1 + \sqrt{1 + \frac{16 T_r}{N^2 T_s \pi^2}}}{1 + \sqrt{1 + \frac{16 T_r}{T_s \pi^2}}} \quad (2)$$

where
$T_r$: flyback period
N: $2k + 1$, where $k = 1, 2, 3, \ldots$.

In the formula (2), when $N = 3$, it is referred to as a third-order tuning, and when $N = 5$, it is referred to as a fifth-order tuning. Similarly, it is referred to as an Nth-order tuning depending on the number of N. For each order, the magnitude of $\beta/\alpha$ changes depending on a ratio of $T_r/T_s$. For example, when $T_r = 12$ μs and 14 μs, (it is assumed that a horizontal repetition period is 63.5 μs), the magnitudes of $\beta/\alpha$ for the respective orders are shown in Table 1 below.

Table 1

| Number of order N | $\beta/\alpha$ | |
|---|---|---|
| | $T_r = 12$ μs | $T_r = 14$ μs |
| 3 | 2.79 | 2.75 |
| 5 | 4.62 | 4.56 |
| 7 | 6.45 | 6.35 |
| 9 | 8.28 | 8.16 |
| 11 | 10.20 | 9.97 |
| 13 | 11.97 | 11.78 |

Figure 3A:
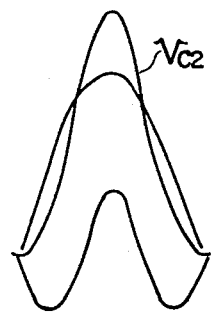
FIGS. 3a, 3b and 4 show waveforms for explaining the operation of the circuit of FIG. 1.
Figure 3B:
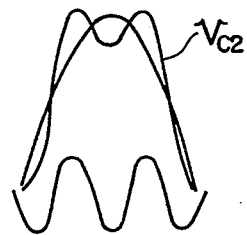

It is seen from the formula (1) that a ratio of the fundamental component to the harmonic component of the output $V_{C2}$ is equal to $\alpha/\beta$, and has a substantially constant value determined depending on the number of order of tuning as seen from the Table 1. As for the output waveform, for the 3rd, 7th and 11th order tunings, the $V_{C2}$ waveforms include central convexes as shown in FIG. 3(a) (which shows the 3rd order tuning), while for the 5th, 9th and 13th order tunings, the waveforms include central concaves as shown in FIG. 3(b) (which shows the 5th order tuning). Now taking the 3rd and 5th order tunings as examples, the comparison therebetween and the relation to the regulation are explained. FIG. 3(a) shows output waveforms for the 3rd order tuning and FIG. 3(b) shows output waveforms for the 5th order tuning. As is apparent from the comparison of the waveforms, the 5th order tuning waveform is broader than the 3rd order tuning waveform. As a result, it is apparent that when loaded the 5th order tuning presents wider diode conduction angle than the 3rd order tuning and hence better high voltage regulation. Thus, the 5th or 9th order tuning has been frequently adopted to improve the regulation.

Figure 4:
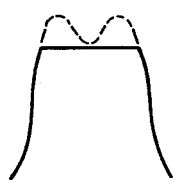

However, as seen from FIG. 3(b), since the waveform involves double peaks, a large voltage variation is observed in a small current region until the double peaks are clipped off as shown in FIG. 4.

Since the circuit configuration of FIG. 1 has a drawback of large high voltage variation as described above, many approaches to reduce the high voltage variation have been proposed. Those include a method of stabilizing a high voltage by changing the width of a pulse in accordance with the variation in high voltage load, using a saturable reactor, a method for changing a D.C. power supply in accordance with the variation in the high voltage load, and a method of connecting a bleeder resistor following a high voltage rectifier.

Figure 5:
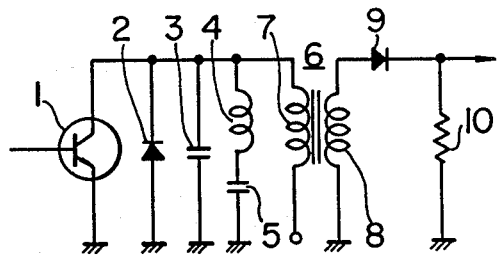
FIG. 5 shows a circuit configuration of a prior art high voltage generator using a bleeder resistor.
Figure 6:
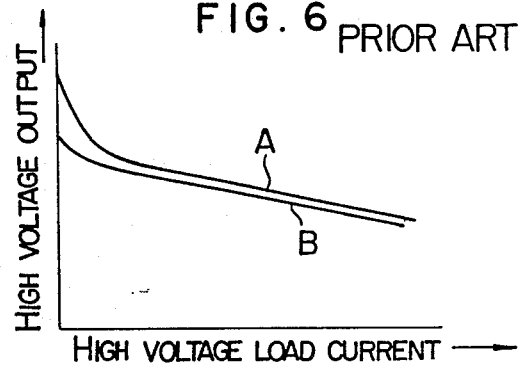
FIG. 6 shows characteristic curves for explaining the operation of the circuit of FIG. 5.

FIG. 5 shows a circuit configuration which reduces the high voltage variation by inserting a bleeder resistor 10 following to a high voltage diode. In this circuit, a satisfactory result is obtained only when a constant current is always passed through the bleeder resistor 10 to clip off the double peaks. Referring to FIG. 6, a curve A shows a regulation characteristic when no bleeder resistor is inserted and a curve B shows a regulation characteristic when the bleeder resistor 10 is inserted. However, when the bleeder resistor 10 is inserted as shown in FIG. 5, an additional current other than a CRT current flows through the bleeder resistor 10 resulting in a power loss of $E_{HT}^2/R$ where R is a resistance of the bleeder resistor 10 and $E_{HT}$ is the magnitude of the high voltage. In addition, because the resistor is connected between the high voltage source and the ground, it must withstand the high voltage and a sufficient care must be paid for the insulation. As a result, the apparatus is naturally more expensive and less reliable.

It is an object of the present invention to provide a high voltage generator which is simple in circuit configuration and facilitates the improvement of the high voltage regulation.

It is another object of the present invention to provide a high voltage generator which suppresses spurious oscillation generated during scan period.

The present invention is characterized in that a frequency dependent attenuation circuit is connected in series between a primary winding of a flyback transformer and a B power supply or connected with the intermediate part of the primary winding of the flyback transformer to effectively attenuate harmonic components for relieving concave or convex characteristics in an output waveform whereby the high voltage regulation is improved.

Preferred embodiments of the present invention are now described in conjunction with the drawings.

Figure 7:
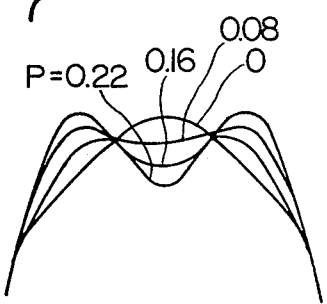
FIG. 7 shows waveforms for explaining the present invention.

FIG. 7 shows curves illustrating the relation between the fundamental wave and the harmonic waves for explaining the feature of the present invention. For the $(4k + 1)$th order tuning such as 5th, 9th or 13th order tuning, the phase of the fundamental wave is opposite to that of the harmonic wave at the center of the output waveform and the output waveform has double peaks with a center concave, the depth of which changes with the magnitude of the harmonic wave. FIG. 7 shows such relation for the 5th order tuning. In FIG. 7, P represents a ratio of the fundamental component to the harmonic component. As seen from the formula (1) described above and $\beta/\alpha$ given in the Table 1, P is approximately 0.22 and a deep concave is observed.

Figure 8:
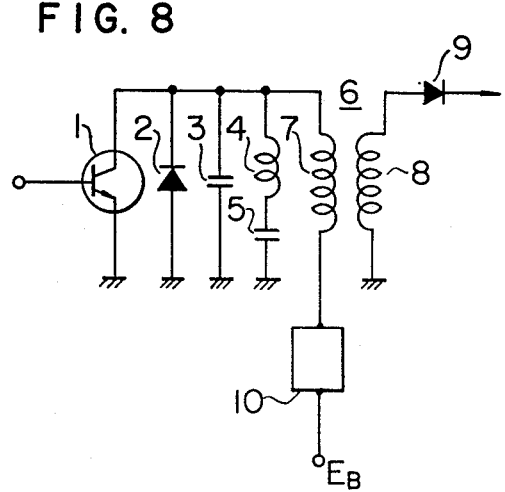
FIG. 8 shows a circuit configuration of a high voltage generator in accordance with the present invention.

FIG. 8 shows a basic circuit configuration to a high voltage generator of the present invention, in which a frequency dependent attenuation circuit 10 is connected in series between a primary winding 7 of a flyback transformer 6 and a B power supply to attenuate harmonic components for relieving the concave characteristic in the output waveform shown in FIG. 7, whereby the high voltage regulation is improved.

Figure 9:
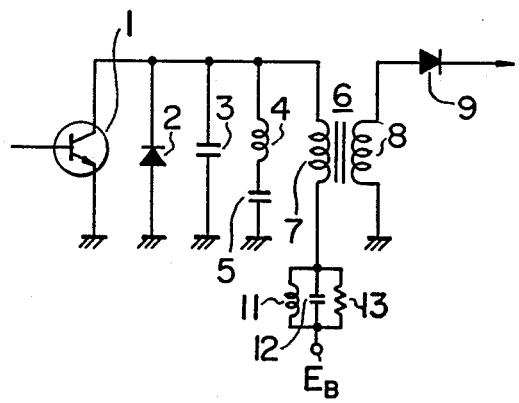
FIG. 9 shows a circuit configuration of a high voltage generator in one embodiment of the present invention.

FIG. 9 shows a circuit configuration of a specific embodiment of the attenuation circuit 10 shown in FIG. 8.

The difference between the embodiment of FIG. 9 and the prior art circuit of FIG. 1 lies in that the attenuation circuit 10, that is, an LCR parallel circuit comprising an LC parallel resonance circuit including an inductor 11 and a capacitor 12, and a resistor 13 connected in parallel thereto, is connected in series between the primary winding 7 of the flyback transformer 6 and the B power supply. The remaining portions of the circuit of FIG. 9 is identical to those of FIG. 1 and designated by the same reference numerals.

Figure 10:
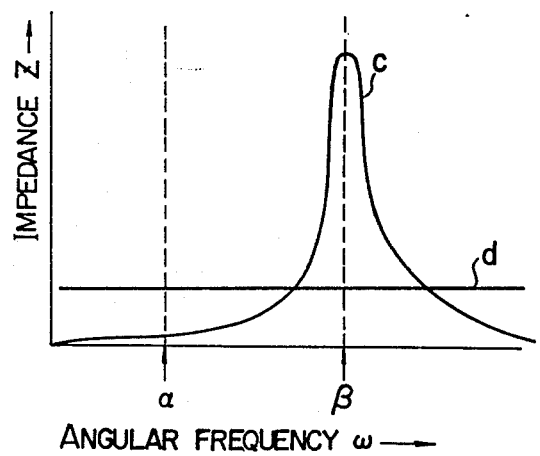
FIG. 10 shows an impedance characteristic curve for explaining the present invention.

In FIG. 9, assuming that the inductance of the inductor 11 is $L_0$, the capacitance of the capacitor 12 is $C_0$, and the resistance of the resistor 13 is $R_0$, the circuit parameters are selected such that a resonance angular frequency $L_0C_0$ is approximately equal to a harmonic angular frequency $\beta$. FIG. 10 shows impedance characteristics of the attenuation circuit 10, in which a curve $c$ shows an impedance characteristic of the LC resonance circuit comprising the inductor 11 and the capacitor 12 and a curve $d$ shows an impedance characteristic of the resistor 13. A principle of operation of the present invention is now explained with reference to FIG. 10. Major portion of the fundamental angular frequency current ($\alpha$ component) flows through the low impedance LC circuit comprising the inductor 11 and the capacitor 12 (mostly through the inductor 11) and minor portion of the current flows through the resistor 13. Therefore a resistive loss is small. Conversely, a major portion of the harmonic current ($\beta$ component) flows through the low impedance resistor 13 resulting in a large resistive loss. Because of this resistive loss, the harmonic component in the output voltage $V_{C2}$ is largely attenuated to compare with the fundamental component. As a result, the depth of the concave in the output waveform is reduced as shown in FIG. 7 so that the voltage variation in the small current region is effectively suppressed.

Figure 11:
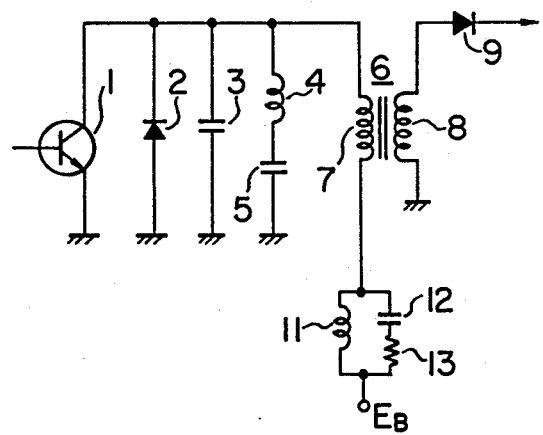
FIGS. 11, 12, 13 and 14 show circuit configurations of other embodiments.

FIG. 11 shows a circuit configuration of another embodiment of the present invention similar to FIG. 9. In FIG. 11, an LCR circuit comprising the LC parallel resonance circuit including the inductor 11 and the capacitor 12 and having a resonance frequency approximately equal to the harmonic frequency, and the resistor 13 connected in series with the capacitor 12, is connected in series between the primary winding 7 of the flyback transformer 6 and the B power supply terminal $E_B$. In this embodiment, since the resonance frequency of the LCR circuit is approximately equal to the harmonic frequency, the harmonic current ($\beta$ component) resonances in the LCR circuit, which then exhibits a high impedance and largely attenuates the harmonic current by the resistor 13. On the other hand, the fundamental current ($\alpha$ component) flows through the low impedance inductor L and hence it is not substantially attenuated. As a result, the harmonic component $\beta$ of the high voltage output waveform from the flyback transformer 6 is largely attenuated compared with the fundamental component $\alpha$ so that the output waveform is flattened and the voltage variation in the small current region is reduced.

Figure 12:
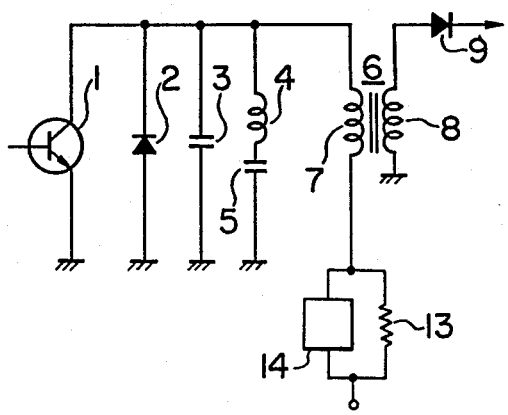

FIG. 12 shows other embodiment of the present invention similar to FIG. 9. In FIG. 12, numeral 14 denotes a filter comprising a mechanical filter, crystal filter or the like, an attenuation band of which is selected to be approximately equal to the harmonic frequency. In the present embodiment, like in the embodiment of FIG. 9, the harmonic component is effectively attenuated to improve the regulation.

As described in connection with the embodiments of FIGS. 9, 11 and 12, by connecting the LCR resonance circuit in series between the primary winding of the flyback transformer and the B power supply terminal $E_B$, the harmonic component $\beta$ of the high voltage output waveform is effectively attenuated whereby the output waveform from the flyback transformer is flattened and hence the high voltage regulation is improved. This is accomplished by adjusting the impedance characteristics shown in FIG. 10 by properly selecting the resonance frequency of the resonance circuit, Q of the circuit and the resistance of the additionally inserted resistor or inductance L of the LC circuit to provide an optimum amount of attenaution for the harmonic component $\beta$.

Figure 13:
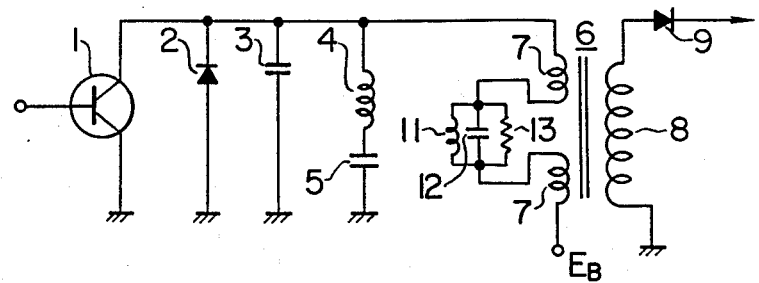

While the LCR parallel circuit is connected to the lower voltage terminal of the primary winding 7 of the flyback transformer 6, it should be understood that the same effect is obtained when the LCR parallel circuit is inserted intermediate of the primary winding 7 as shown in FIG. 13. Although not shown, the LCR parallel circuit may be connected even to a higher voltage terminal of the primary winding.

While the advantage of the present invention has been explained in conjunction with the output waveform with double peaks such as those for 5th and 9th order tuning (($4k + 1$)th order tuning), the present invention is also useful in reducing the concave characteristic in the output waveform which appears in the 7th and 11th order tuning (($4k - 1$)th order tuning).

Figure 14:
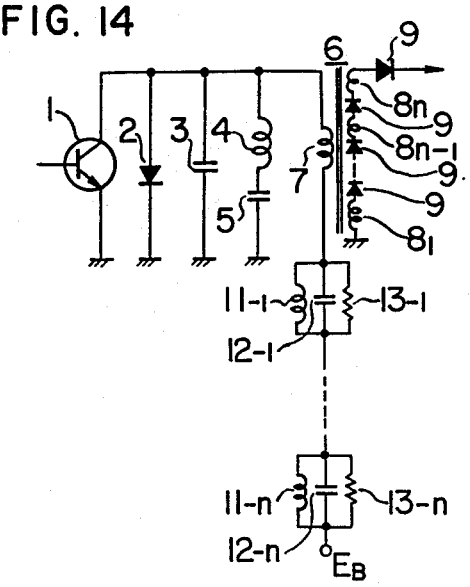

FIG. 14 shows other embodiment of the present invention, in which the secondary winding is divided into $n$ sections $8_1, 8_2, \ldots 8_{n-1}, 8n$ by high voltage rectifying diodes 9. In this embodiment, each of the $n$ secondary diodes 9. In this embodiment, each of the $n$ secondary sub-windings may be tuned to any number of order. When the circuit is arranged for multiple tuning, one set of LCR circuits for a particular number of order may be inserted or a plurality of sets of LCR circuits each corresponding to respective ones of the orders may be connected in series.

Figure 15:
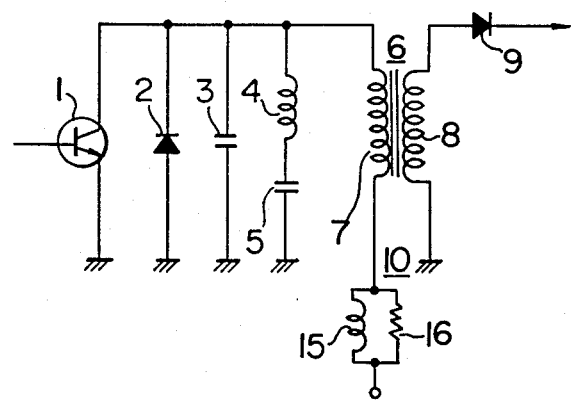
FIG. 15 is a high voltage generator in other embodiment of the present invention.
Figure 16:
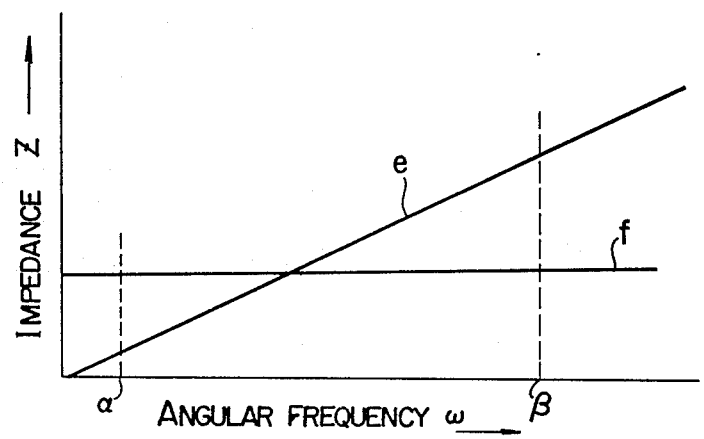
FIG. 16 shows an impedance characteristic curve thereof.

FIG. 15 shows still other embodiment of the present invention, which differs from the embodiment of FIG. 9 in that an LR parallel circuit 10 comprising the inductor 15 and the resistor 16 is connected between the lower voltage terminal of the primary winding 7 of the flyback transformer and the B power supply. FIG. 16 shows impedance-frequency characteristics of the inductor 15 (L) and the resistor 16 (R), in which curves $e$ and $f$ show the impedance curves for L and R, respectively.

As seen from the LR impedance characteristics of FIG. 16, a major part of the fundamental component ($\alpha$ component) flows through the low impedance inductor 15 (L) and minor portion thereof flows through the resistor 16 (R). Therefore, resistive loss is small and no substantial damping occurs. On the other hand, major part of the harmonic component ($\beta$ component) flows through the low impedance resistor 16 (R) and hence suffers a large resistive loss. Because of this resistive loss, the harmonic component $\beta$ of the output waveform of the flyback transformer 6 is damped and largely attenuated to compare with the fundamental component $\alpha$. As a result, the depth of the concave in the output waveform (for the ($4k + 1$)th order tuning) is reduced so that the waveform is flattened and the voltage variation in the small current region is suppressed. The amount of attenuation of the harmonic component can be adjusted by properly selecting the constants of the inductor and the resistor. In order to make the LR damping more effective and reduce the resistive loss as much as possible, it is desirable that the constants of the inductor (L) and the resistor (R) satisfy the relation of $\alpha L < R < \beta L$.

Figure 17:
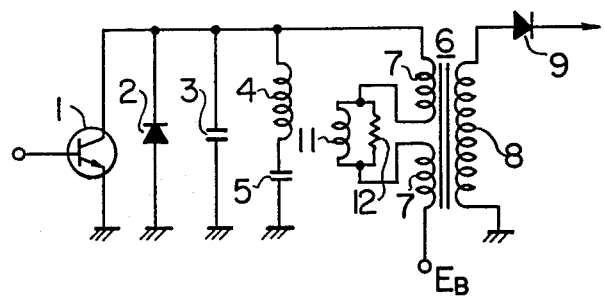
FIGS. 17 and 18 show circuit configurations of modifications of FIG. 15.

While the LR parallel circuit is connected in the embodiment of FIG. 15 to a lower voltage terminal of the primary winding 7 of the transformer 6, it should be understood that the LR parallel circuit may be connected intermediate of the primary circuit 7 as shown in FIG. 17.

Figure 18:
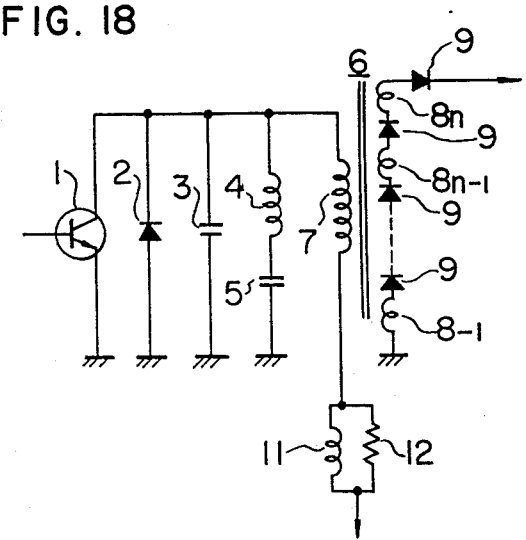

FIG. 18 shows other embodiment in which the secondary winding 8 of the flyback transformer 6 is divided into $n$ sections $8_1, 8_2, \ldots 8_{n-1}, 8n$ by high voltage rectifying diodes 9. In this embodiment, each of the $n$ secondary sub-windings may be tuned to any order of harmonics. It should be noted that the improvement of the regulation is attained by properly selecting the constants of the inductor and the resistor even for a multiple tuning circuit arrangement. If desired, a plurality of LR circuits may be connected in series.

Figure 19:
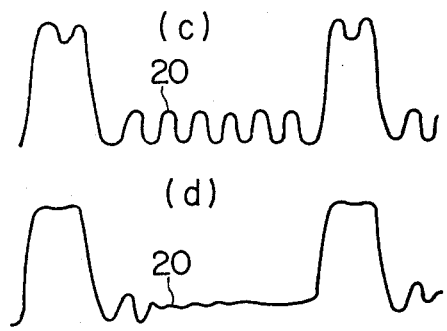
FIGS. 19 and 20 show waveforms for explaining the effect of the present invention.

As described hereinabove, the present invention does not necessiate a number of expensive components which were required in the prior art apparatus but uses only inexpensive inductors, capacitors and resistors. Accordingly, a significant cost reduction is attained and the reliability is enhanced. Because high Q resonance is attenuated, power dissipation is considerably reduced. Furthermore, a spurious ringing generated during the scan period is suppressed so that the loss due to the ringing, the disturbance to other circuits and the increase in a collector current of a horizontal output transistor can be prevented. This is explained with reference to FIGS. 19 and 20. FIG. 19 shows voltage output waveforms of a secondary winding of the flyback transformer 6 for one horizontal period, in which (c) shows a waveform when the attenuation circuit of the present invention is not inserted and (d) shows waveform when the present attenuation circuit is inserted. Where the attenuation circuit is not inserted, a spurious ringing voltage 20 generated during the scan period remains without substantial attenuation over the scan period. Since an angular frequency $\gamma$ of the ringing voltage is approximately equal to $\beta$, the insertion of the attenuation circuit not only flattens the output waveform during the retrace period but also attenuates the ringing voltage 20 during the scan period, as shown in FIG. 19 (d).

Figure 20:
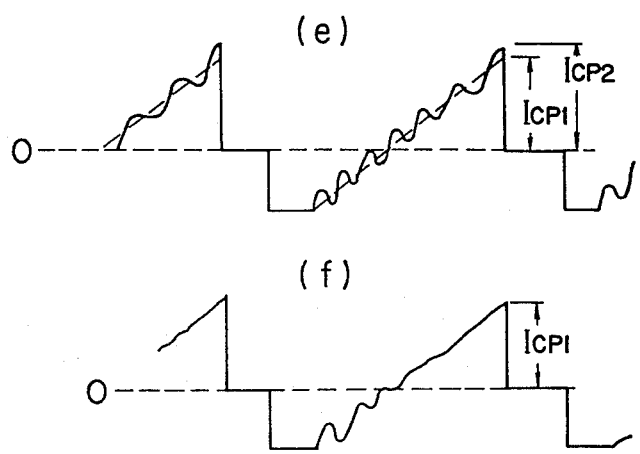

FIG. 20 illustrates the adverse affect of the ringing during the scan period and the effect of the present invention, taking the collector current of the horizontal output transistor as an example. FIG. 20 (e) shows a collector current waveform where no attenuation circuit is inserted, and FIG. 20 (f) shows that where the attenuation circuit is inserted. When the ringing current is superimposed during the scan period, a maximum collector current $I_{cp}$ may increase as shown by $I_{cp2}$ in FIG. 20 (e) depending on the phase of the ringing current. Since the phase of the ringing current is very unstable and varies with the variation in the high voltage load or the variation of the circuit parameters, it is necessary to keep the ringing current small. According to the present invention, the ringing current can be attenuated to substantially zero at the end of the scan period as shown in FIG. 20 (f) so that the increase of $I_{cp}$ is suppressed.

What is claimed is:

1. A high voltage generator comprising:
   a horizontal output circuit for generating a flyback pulse during a retrace period of horizontal scan,
   a flyback transformer having primary and secondary windings for stepping up said flyback pulse,
   a rectifying circuit for rectifying the steeped-up voltage for supplying a D.C. voltage to a CRT,
   a frequency dependent attenuation circuit connected in series with said primary winding of said flyback transformer for causing substantial power loss in a harmonic component in a high voltage output waveform of said flyback transformer while causing substantially no power loss in a fundamental component of the high voltage output waveform, and
   said attenuation circuit attenuating the harmonic component in the high voltage output waveform of said flyback transformer to flatten the top of the retrace pulse waveform of the high voltage output.

2. A high voltage generator according to claim 1 wherein said attenuation circuit comprises a parallel circuit of an inductor, a capacitor and a resistor.

3. A high voltage generator according to claim 1 wherein said attenuation circuit comprises an LC parallel resonance circuit of an inductor and a capacitor, and a resistor connected in series with said capacitor.

4. A high voltage generator according to claim 1 wherein said attenuation circuit comprises a parallel circuit of an inductor and a resistor.

5. A high voltage generator comprising:
   a horizontal output circuit for generating a flyback pulse during a retrace period of a horizontal scan,
   a flyback transformer having primary and secondary windings for stepping up said flyback pulse,
   a rectifying circuit for rectifying the stepped-up voltage for supplying a D.C. voltage to a CRT,
   a frequency dependent attenuation circuit connected intermediate said primary windings of said flyback transformer, and
   said attenuation circuit attenuating harmonic component in a high voltage output waveform of said flyback transformer to flatten the top of the retrace pulse waveform of the high voltage output.

6. A high voltage generator according to claim 1, wherein said attenuation circuit is directly connected between said primary winding and a source of power.

7. A high voltage generator according to claim 1, wherein said attenuation circuit comprises an inductor, a capacitor and a resistor connected in parallel.

8. A high voltage generator according to claim 1, wherein said attenuation circuit comprises a resistor connected in series with a capacitor, the series circuit of the resistor and capacitor being connected in parallel with an inductor.

9. A high voltage generator according to claim 1, wherein said attenuation circuit comprises a resistor connected in parallel with an inductor.

10. A high voltage generator according to claim 5, wherein said frequency dependent attenuation circuit causes substantial power loss in a harmonic component in a high voltage output waveform of said flyback transformer while causing substantially no power loss in a fundamental component in the high voltage output waveform.

11. A high voltage generator according to claim 5, wherein said attenuation circuit comprises an inductor, a capacitor and a resistor connected in parallel.

12. A high voltage generator according to claim 5, wherein said attenuation circuit comprises an inductor and a resistor connected in parallel.

13. A high voltage generator according to claim 5, wherein said attenuation circuit is connected in series between two portions of said primary winding.

14. A high voltage generator according to claim 13, wherein said attenuation circuit includes at least a resistor and an inductor.

* * * * *